United States Patent
Assarsson et al.

(10) Patent No.: US 7,231,221 B2
(45) Date of Patent: Jun. 12, 2007

(54) CHANNEL ACCESS METHODS AND APPARATUS IN LOW-POWER WIRELESS COMMUNICATION SYSTEMS

(75) Inventors: Mikael Assarsson, Borrby (SE); Jacobus Haartsen, Hardenberg (NL); Jan Aberg, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 180 days.

(21) Appl. No.: 10/926,854

(22) Filed: Aug. 26, 2004

(65) Prior Publication Data

US 2005/0064818 A1    Mar. 24, 2005

Related U.S. Application Data

(60) Provisional application No. 60/502,200, filed on Sep. 12, 2003.

(51) Int. Cl.
*H04Q 7/20*    (2006.01)

(52) U.S. Cl. ............... 455/458; 455/502; 455/550.1; 370/336; 370/509

(58) Field of Classification Search ............. 455/458, 455/502, 69, 550, 550.1; 370/509, 447, 336, 370/390, 350; 375/139
See application file for complete search history.

(56) References Cited

U.S. PATENT DOCUMENTS

| | | |
|---|---|---|
| 5,809,421 A | 9/1998 | Manssen et al. |
| 6,028,853 A | 2/2000 | Haartsen |
| 6,351,468 B1 | 2/2002 | LaRowe, Jr. et al. |
| 6,574,266 B1 | 6/2003 | Haartsen |
| 6,959,013 B1 * | 10/2005 | Muller et al. ............... 370/512 |
| 2002/0019215 A1 | 2/2002 | Romans |
| 2002/0034959 A1 | 3/2002 | Jamieson et al. |
| 2002/0068600 A1 * | 6/2002 | Chihara et al. ............. 455/550 |
| 2003/0081603 A1 * | 5/2003 | Rune .......................... 370/390 |
| 2003/0137993 A1 | 7/2003 | Odman |
| 2003/0145092 A1 | 7/2003 | Funato et al. |

(Continued)

FOREIGN PATENT DOCUMENTS

EP    1 207 654 A2    5/2002

(Continued)

OTHER PUBLICATIONS

J. Haartsen, "The Bluetooth Radio System," IEEE Personal Communications, Feb. 2000, pp. 28-36.

(Continued)

*Primary Examiner*—Danh Le
(74) *Attorney, Agent, or Firm*—Potomac Patent Group PLLC

(57) ABSTRACT

An access scheme in a communication system can deal with a mix of devices having different power constraints and different latency requirements and allow highly asymmetric latency behavior. Such a communication system may include a central control station that broadcasts beacon messages on a communication channel, such as a radio channel, and at least one remote terminal that accesses a communication channel based on the beacon messages. The beacon messages are configured such that individual access to the communication channel by each terminal is controlled according to a grouping of the terminals into respective beacon groups. Each beacon group may have a corresponding beacon message, and beacon messages corresponding to different beacon groups may be broadcast at staggered time intervals.

33 Claims, 7 Drawing Sheets

U.S. PATENT DOCUMENTS

| | | | |
|---|---|---|---|
| 2004/0042501 A1* | 3/2004 | Hester et al. | 370/509 |
| 2004/0120342 A1* | 6/2004 | Ekl et al. | 370/447 |
| 2004/0258102 A1* | 12/2004 | Callaway et al. | 370/511 |

FOREIGN PATENT DOCUMENTS

| | | |
|---|---|---|
| EP | 1 207 654 A3 | 5/2002 |
| EP | 1 324 532 A2 | 7/2003 |
| WO | WO 01/89183 A1 | 11/2001 |
| WO | WO 02/23818 A2 | 3/2002 |

OTHER PUBLICATIONS

F. Choong, et al., "Bluetooth," Ericsson Research—Cyberlab Singpore and Open Source Software Lab, Jun. 2000, pp. 1-88.

J. Milios, "Reducing Power Consumption of Bluetooth Devices," SEMTECH Intel Developer Forum, Aug. 22-24, 2000, pp. 1-19.

J. Bray, et al., "Bluetooth—Connect Without Cables," Prentice-Hall, Inc., 2001, pp. 321-330.

EPO, International Search Report, PCT/ISA/210, Jan. 21, 2005, 5 pages.

EPO, Written Opinion, PCT/ISA/237, Jan. 21, 2005, 6 pages.

* cited by examiner

FIG. 2             PRIOR ART

CHANNEL ACCESS METHODS AND APPARATUS IN LOW-POWER WIRELESS COMMUNICATION SYSTEMS

This application claims the benefit of U.S. Provisional Patent Application No. 60/502,200 filed on Sep. 12, 2003, the entirety of which is incorporated here by reference.

BACKGROUND

This invention relates to communication systems. In particular, it relates to cordless, cellular, Wireless Local Area Network (WLAN), or Wireless Personal Area Network (WPAN) systems controlling low power terminals.

In the last decades, progress in radio and semiconductor very large scale integration (VLSI) technology has fostered widespread use of radio communications in consumer applications. Portable devices, such as mobile radios, can now be produced having acceptable costs, sizes, and power consumptions.

Although wireless technology is today focused mainly on voice communications (e.g., handheld radios), this field is rapidly expanding to provide greater information flow to and from other types of mobile, or nomadic, devices and fixed devices. Progress in technology and rising production volumes provide inexpensive radio equipment, which can be easily integrated into many devices. This reduces the number of cables currently used. For instance, radio communication can eliminate or reduce the number of cables used to connect master devices with their respective peripherals. The aforementioned radio communications can require an unlicensed spectral band with sufficient capacity to allow for high data rate transmissions. A suitable band is the ISM (Industrial, Scientific and Medical) band at 2.45 GHz (gigahertz), which is globally available. This ISM band provides 83.5 MHz (megahertz) of radio spectrum.

To allow different radio networks to share the same radio medium without coordination, signal spreading is usually applied. The U.S. Federal Communications Commission currently requires radio equipment operating in the 2.4 GHz band to apply some form of spreading when the transmit power exceeds about 0 dBm. Spreading can either be at the symbol level by applying the direct-sequence (DS) spread spectrum technique or at the channel level by applying the frequency hopping (FH) spread spectrum technique. The latter is attractive for the radio applications mentioned above since it more readily enables cost-effective radios.

A communication system called BLUETOOTH® has been developed to provide pervasive connectivity especially between portable devices like mobile phones, laptop computers, personal digital assistants (PDAs), and other nomadic devices. A BLUETOOTH® system uses frequency hopping to enable the construction of low-power, low-cost radios with small footprints. The system supports both data and voice, and the latter is optimized by applying fast frequency hopping with a nominal rate of 800 hops/second through the entire 2.4 GHz ISM band in combination with a robust voice coding. The air interface uses time slots having nominal lengths of 625 microseconds (µs), which corresponds to the dwell time of the FH. During a time slot, a single packet can be sent.

BLUETOOTH® wireless terminals can create so-called "ad hoc" piconets, which include a "master" device and one or more "slave" devices connected via the FH piconet channel. The FH sequence used for the piconet channel is completely determined by the address or identity of the device acting as the master. The system clock of the master device determines the phase in the hopping sequence. In a BLUETOOTH® system, each device has a free-running system clock. The slave devices add time offsets to their clocks such that they become aligned with the clock of the master device. By using the master address to select the proper hopping sequence and using a time offset to align to the master clock, the slave devices keep in hop synchrony to the master device, which is to say that the master and slave devices remain in contact by hopping synchronously to the carrier frequencies.

For more details of BLUETOOTH® communication systems, the reader is referred to the literature, which includes J. C. Haartsen, "The Bluetooth radio system", *IEEE Personal Communications Magazine*, vol. 7, no.1, pp. 28–36 (February 2000).

In many wireless applications, traffic demand in the slave devices is low. For example, normal use of a headset wirelessly connection to a telephone may not exceed 20–40 minutes per day. Another low-traffic example is a keyboard or a mouse or a game controller wirelessly connected to a personal computer (PC). Accumulated over a day, there may be no traffic for a few hours. Yet another low-traffic example is a monitoring system of sensors distributed in a house or factory. Once in a while a sensor reading must be reported, but the duty cycle of such a monitoring system is low.

In these examples, slave units are in a sleep mode most of the time in order to save power. Many such wireless terminals receive their power supply, not from the power mains, but from batteries, which imposes stringent requirements on the power consumption of the terminals. Simple, low-cost, low-power terminals can be built when a star network is considered. FIG. 1 depicts a conventional wireless communication system 100 arranged as a star network. A central controller 110 provides one or more communication channels on which remote terminals 120, 130, 140, 150, 160 and controller 110 can communicate. The intelligence needed to operate the system 100 can be concentrated in the controller 110, so the remote terminals can be simpler, "dumb" devices. On the other hand, the terminals and controller can all be similar, as in many BLUETOOTH® networks. While no traffic is offered to the channel, the terminals can operate in low-power mode in order to extend the battery life of the terminals.

Terminal operation in low-power mode can be facilitated by a beacon signal broadcast by the central controller 110. The terminals remain time-synchronized to the beacon. When the beacon is about to be transmitted, the terminals wake up, receive the beacon signal, process it appropriately, viz., the terminals "read" the beacon. Depending on information read from the beacon, further actions are taken by the terminals. FIG. 2 is a timing diagram of a conventional beacon signal provided by a central controller and activity periods of two remote terminals. A beacon signal 210 is broadcast by the central controller 110 at a regular interval, and the terminals, represented by Terminal A and Terminal B in FIG. 2, wake up during the beacon transmission and read, or scan it, and sleep otherwise. In the case depicted in FIG. 2, data links to the terminals are not established, so they operate in an idle or standby mode.

Communication systems using such beacon signals are cordless telephone systems such as the Digital Enhanced Cordless Telephone (DECT) system and cellular telephone systems such as those specified by the GSM and IS-95 telecommunication standards. In such systems, however, only a single type of terminal is attached to the network, i.e., a voice terminal. Latency requirements do not differ between terminals, and the same latency characteristics are expected in the uplink (terminal-to-controller path) and the downlink (controller-to-terminal path). In addition, the number of terminals sharing a single beacon is not extremely large, and so the probability that a terminal's channel access will be blocked due to contention with other terminals' simultaneous channel access attempts can be kept manageably low.

U.S. Pat. No. 6,028,853 to Haartsen discloses a method and arrangement for synchronizing peripheral units in an ad hoc wireless network. The synchronization is achieved by two series of beacon signals staggered in time. The beacon series have the same repetition rate.

U.S. Pat. No. 6,351,468 B1 to LaRowe, Jr., et al. discloses a WPAN having a hub and several peripheral units. Synchronization of the network is achieved by transmission of a beacon signal from the hub.

U.S. Patent Application Publication No. 2002/0019215 A1 by Romans discloses a power management method and apparatus for use in a WLAN. A control point transmits beacon signals at regular intervals and peripheral units switch to their active modes to receive at least some of the beacon signals.

International Patent Publication No. WO 02/23818 A2 by Jamieson et al. and its counterpart U.S. Patent Application Publication No. 2002/0034959 A1 disclose a method and a system for transferring data in a master/slave radio network. The slaves are grouped into categories, and data-pending indications that relate to entire categories are included in a beacon signal from the master that is monitored by all slaves. Channel access is based on carrier sense multiple access (CSMA), which requires a mechanism for channel contention resolution.

SUMMARY

Applicants' invention overcomes problems and deficiencies in previous systems with an access scheme in a communication system that can deal with a mix of devices having different power constraints and different latency requirements and that allows highly asymmetric latency behavior.

In one aspect of the invention, there is provided a communication system that includes a central control station that broadcasts beacon messages on a communication channel, such as a radio channel, and at least one remote terminal that accesses a communication channel based on the beacon messages. The beacon messages provide timing references for the terminal or terminals, signal a terminal that data is waiting in the control station, enable the terminals to request access to the communication channel, and are configured such that access to the communication channel by a terminal is controlled according to a grouping of the terminal into a respective beacon group. Each beacon group may have a corresponding beacon message, and beacon messages corresponding to different beacon groups may be broadcast at staggered time intervals.

In another aspect of the invention, there is provided a terminal for a communication system that includes a transmitter that sends messages through a communication channel, a receiver that receives messages from the communication channel, and a controller that operates the transmitter and receiver in response to beacon messages on the communication channel. The terminal uses beacon messages as a timing reference, as signals that messages are waiting to be received, and to enable the terminal to request access to the communication channel, and the terminal accesses the communication channel according to a grouping of the terminal into a respective beacon group.

In another aspect of the invention, there is provided a central control station for a communication system that includes a transmitter configured to send messages through a communication channel, a receiver configured to receive messages from the communication channel, and a controller configured to cause the transmitter to broadcast beacon messages on the communication channel. The beacon messages provide a timing reference, signal that data is waiting in the control station, enable requests for access to the communication channel, and are configured such that access to the communication channel is controlled according to beacon groups.

BRIEF DESCRIPTION OF THE DRAWINGS

The several features, objects, and advantages of Applicants' invention will be understood by reading this description in conjunction with the drawings, in which.

DETAILED DESCRIPTION

Figure 1:
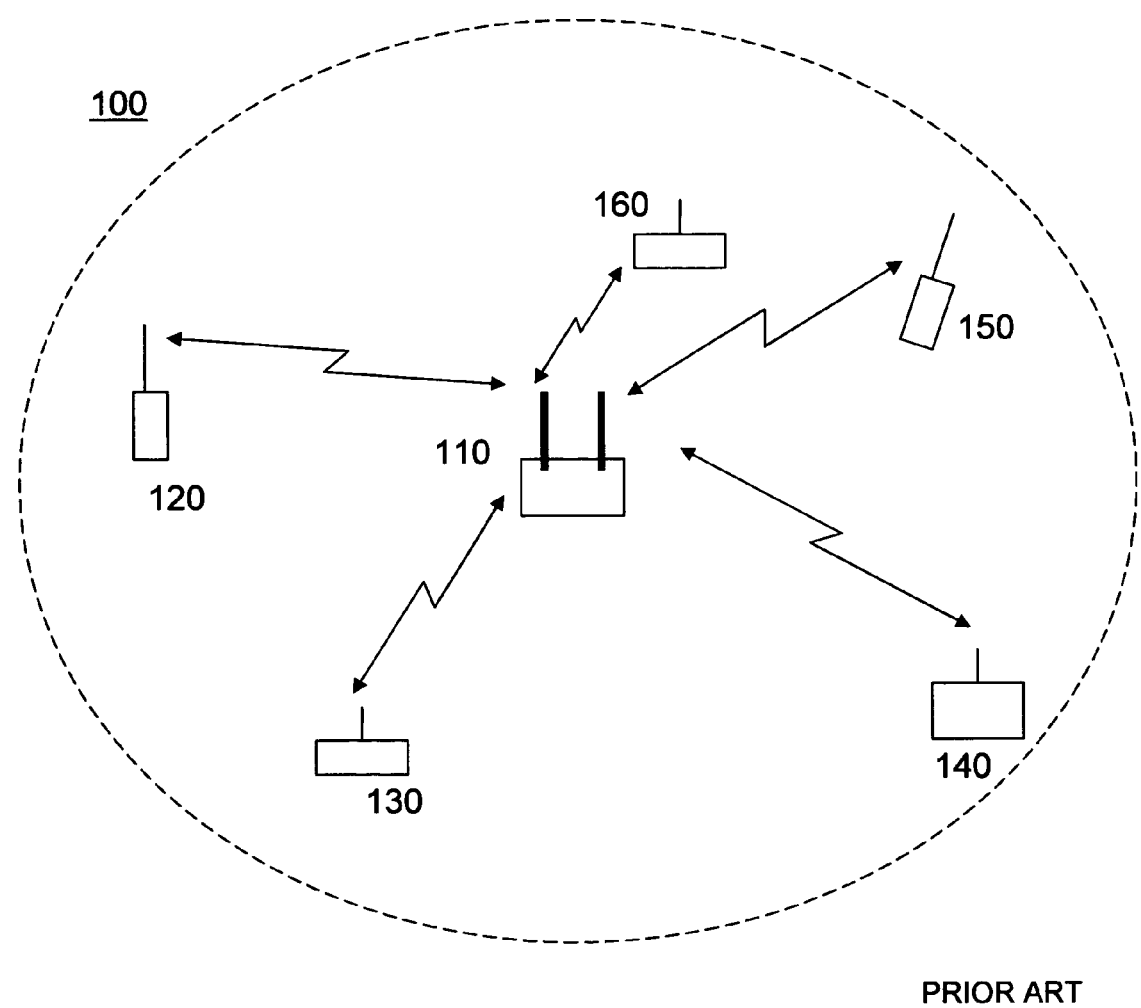
FIG. 1 depicts a conventional wireless communication system having a central controller and remote terminals.
Figure 2:
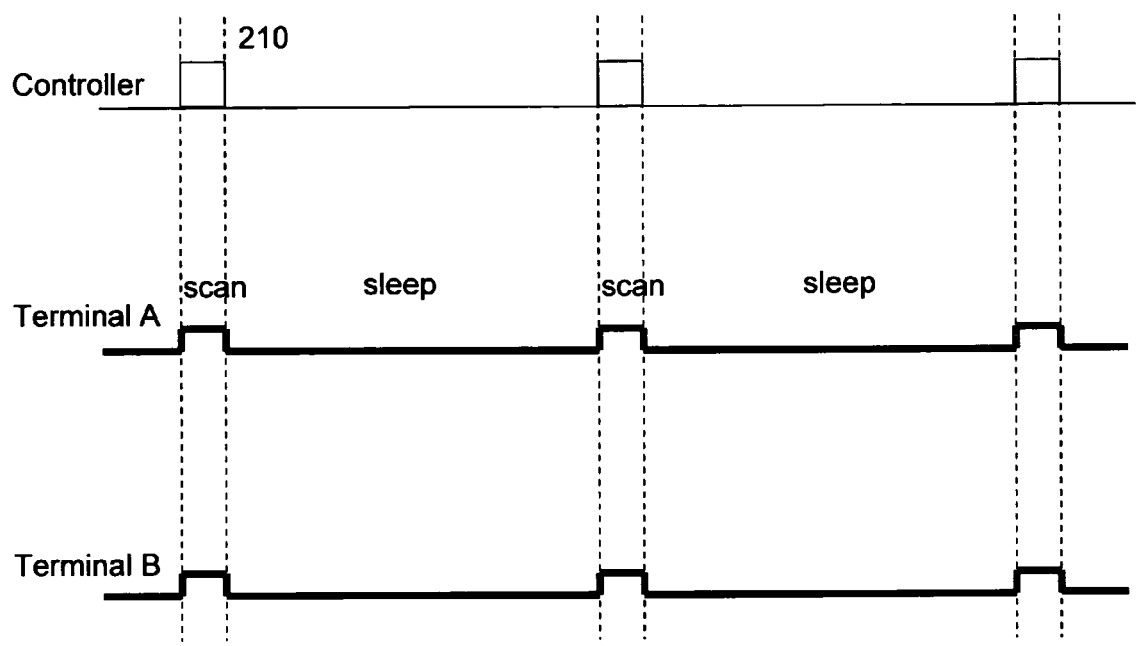
FIG. 2 is a timing diagram of a conventional beacon signal provided by a central controller and activity periods of two remote terminals.

While mobile phones drove the large-scale application of radio for commercial use, small and inexpensive radio technologies like BLUETOOTH® technology have further led to wireless applications in the consumer segment. Replacing cables by a radio link has many advantages, like mobile/portable equipment, easy installation, and easy maintenance. With costs continuing to decrease, this trend will likely continue, resulting in large-scale deployment of small radios in all kinds of devices, portable and fixed.

A new segment that is getting increased attention is automation, e.g., automatic control of home and industrial systems. Both home and industrial automation are segments where a large number of radio units can find use. Examples are sensors in the home for purposes such as burglary alarms, temperature controls, humidity controls, remote control of curtains, window shields, light bulbs, and so on. An even larger application segment is industrial environments, where processes are controlled remotely and huge numbers of sensors and actuators are spread across factory floors. Wireless remote control interfaces for movable lorries and other vehicles are yet another application.

At the same time as low power consumption is required in these applications, short uplink latencies are desired: as a remote terminal or slave unit comes awake, it should communicate with the central or master controller within some tens of milliseconds. Usually, latency and power requirements are not uniform among the slaves connected to the same controller. As an example of this, consider a monitoring system: temperature readings taken every hour may permit communication delays of seconds or even minutes, while water level readings taken every second may not be delayed by more than a few milliseconds (ms).

Downlink latency requirements can also differ widely from uplink latency requirements. As an example of this, consider a headset wirelessly connected to a mobile phone. For an outgoing call, the headset-to-phone (uplink) latency must be short: as the user pushes a button on the headset, the user should experience the corresponding action within, say, 100 ms. Yet for an incoming call, many processes take place in the cellular network that introduce delay, so an additional phone-to-headset (downlink) delay of a second or two will not be noticeable to either the caller or the headset user. As another example of different downlink/uplink latencies, consider a light switch that is wirelessly connected to a controller, which in turn is connected to a light bulb. The switch may be power-consumption-constrained and its latency requirements towards the controller are stringent: after a change in the switch, action should be experienced within, say, 100 ms. The bulb, on the other hand, is not power-consumption-constrained but its latency requirements from the controller are also stringent: after the controller has received a message to turn on the light, the bulb should be activated within a few hundred milliseconds.

In contrast to previous uses of beacon signals, this disclosure describes beacon signal techniques that serve networks of terminals having different latency requirements. Applicants' techniques also support channel access in networks in which uplink/downlink latencies differ significantly, and they enable large numbers of terminals to be served without blocking problems.

Applicants' have recognized that a beacon message can serve three purposes: it provides a timing reference for terminals (so they need to wake up only when the beacon message transmission is happening, thereby saving power); it signals one or more terminals that data is waiting in the controller (so other terminals may enter a sleep mode as quick as possible); and it enables the terminals to request access to the channel (if the terminal has data to send to the controller).

When the central controller or master sends a beacon at fixed intervals, the terminals know when the beacons arrive and have to start scanning only just before the beacon transmission starts and can end scanning when the beacon transmission ends. In this way, the scan/sleep duty cycle in the terminal can be minimized, thereby optimizing the power consumption in the terminal. The duty cycle is determined by the beacon interval and the accuracy of the clocks in the central controller and the terminals. Due to mutual drift among the clocks, the exact time of beacon transmission expected by the terminal becomes less certain as the beacon interval increases and/or the accuracy of the clocks decreases. As a consequence, the terminal has to wake up earlier in order not to miss the beacon transmission. Low-cost terminal implementations usually have relaxed accuracy requirements, and yet more complex implementations may improve the timing accuracy by estimating the drift and compensating for it.

In addition to synchronization, the beacon interval has an impact on the latency. The latency in the uplink can be largely determined by the controller's beacon interval: the shorter the interval, the shorter the latency. The latency in the downlink is largely determined by the terminal's scan interval: again, the shorter the interval, the shorter the latency.

Applicants have recognized that terminals having different latency requirements can be supported by organizing the terminals into a plurality of beacon groups. Terminals having the same latency requirements are collected in the same beacon group, and each beacon group is served by its own beacon, which does not necessarily occur at fixed intervals. All beacons are transmitted on the same communication channel but at different times, which has the effect of interleaving the different beacons by time division multiplexing. Nevertheless, it will be appreciated that more than one channel can be used for beacons; such channels can then be considered separately as described here.

Figure 3:
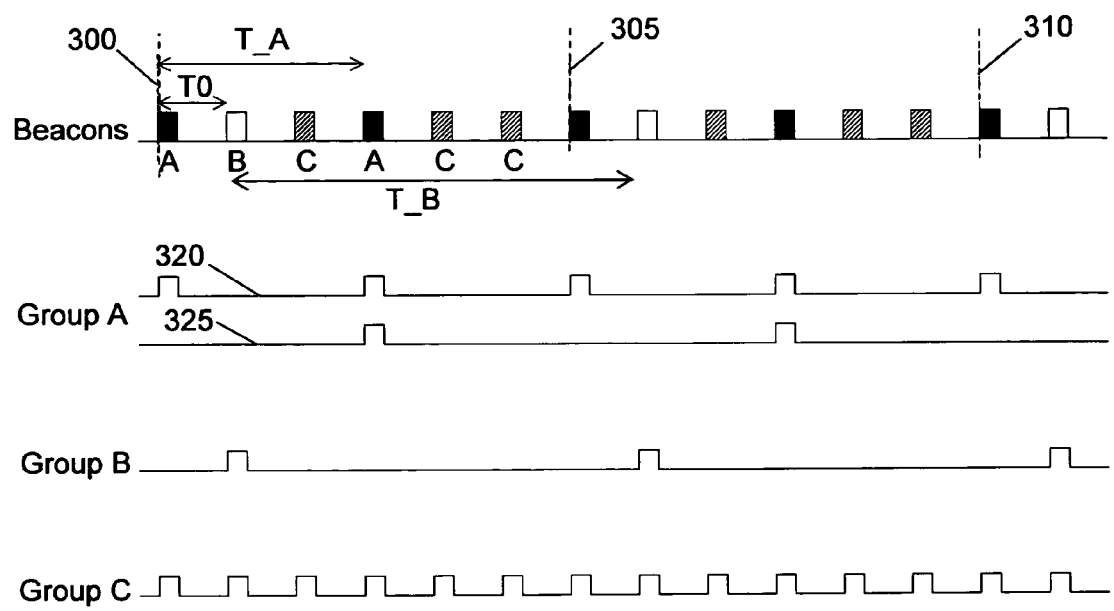
FIG. 3 is a timing diagram showing exemplary beacon groups according to Applicants' invention.

FIG. 3 is a timing diagram of an exemplary communication system having three beacon groups identified as Groups A, B, and C. It can be seen that the sequence of beacon messages looks like a grid or picket fence, and let the interval between beacon messages, or the beacon window or grid timing, be T0 seconds (s). In FIG. 3, beacon messages intended for terminals in Group A (full-colored blocks) are shown as having a fixed beacon interval $T\_A=3\times T0$ s; beacon messages intended for Group B terminals (uncolored blocks) are shown as having a beacon interval that is twice that of Group A, or $T\_B=6\times T0$ s; and beacon messages intended for Group C terminals (half-colored blocks) are shown as having an irregular beacon interval. Stated another way, in each beacon cycle, or interval, of 6×T0, two of which are indicated by the lines 300, 305, 310, Group A owns two potential beacon transmissions, Group B owns one potential beacon transmission, and Group C owns six potential beacon transmissions. The potential messages intended for each Group are also illustrated separately in FIG. 3.

In FIG. 3, the irregularity of beacon transmission for Group C rather than of Group C itself may be noted. In principle, a unit can wake up (regularly or irregularly) to any beacon, e.g., just to remain synchronized, but it is only on the beacons corresponding to the unit's Group where transactions can take place. The uppermost trace in FIG. 3 shows an irregular sequence of Group C (half-colored) beacons. If Group C terminals carry out irregular scans, then Group C terminals may wake up only at the Group C beacons, such as those shown as half-colored in FIG. 3. It will be noted that in that case, all beacons and all Groups are completely separated. Considering the lowest trace in FIG. 3, it may seem odd that the Group C terminals can also wake up at the beacons for Groups A and B. This can be advantageous for several reasons, e.g., beacon replacement, which is described in more detail below, and maintaining synchronization. If a Group C slave terminal has a clock that drifts with respect to the master terminal's clock, the terminal might slip out of sync if the time interval between resynchronizations is too long.

The uplink latency for the terminals in Group A is less than (i.e., half of) the uplink latency for the terminals in Group B. Group C is able to support more terminals than Groups A or B before blocking problems occur as more access possibilities are present per cycle of 6×T0 s (i.e., 6 vs. 2 or 1). In an alternative embodiment, the controller may replace a beacon of one group by a beacon of another group if urgent operations have to be initiated by the controller. In FIG. 3 for example, terminals in Group C may need a downlink latency of T0 s, so the Group C terminals, which wake up at every beacon instant, are awake to receive the beacons belonging to Groups A and B as well as their own. In the event the controller needs to reach a Group C terminal very quickly, it can do so simply by replacing a Group A or B beacon with a Group C beacon. An example of this is described below in connection with FIG. 8.

FIG. 3 also illustrates a situation in which the latency in the downlink is also different. For example, Group A may include two terminals having different downlink requirements, in which case one terminal need not wake up for every beacon transmission intended for Group A. In FIG. 3, one Group A terminal 320 wakes up at every beacon transmission belonging to its group as indicated by the trace 320, and thus the uplink and downlink latencies are identical for this terminal. In contrast, another Group A terminal 325 wakes up only every two beacon transmissions intended for its group as indicated by the trace 325. When the terminal 325 has data to send in the uplink, it can of course choose to wake up at any beacon of group A, and thus its uplink latency is that of the beacon interval of Group A, but since the terminal 325 wakes up to receive data in the downlink only every two beacons, its downlink latency is double that of its uplink latency and is double that of the terminal 320. Stated another way, the uplink latency of terminal 325 is half its downlink latency. It will also be noted that although the terminal 325 has the same duty cycle as the terminals in Group B, the terminals in Group B have an uplink latency that is twice that of the terminal 325. Of course, different relationships can be chosen that accommodate different latency differences between terminals in a group or between uplink and downlink latencies in a terminal.

Figure 4:
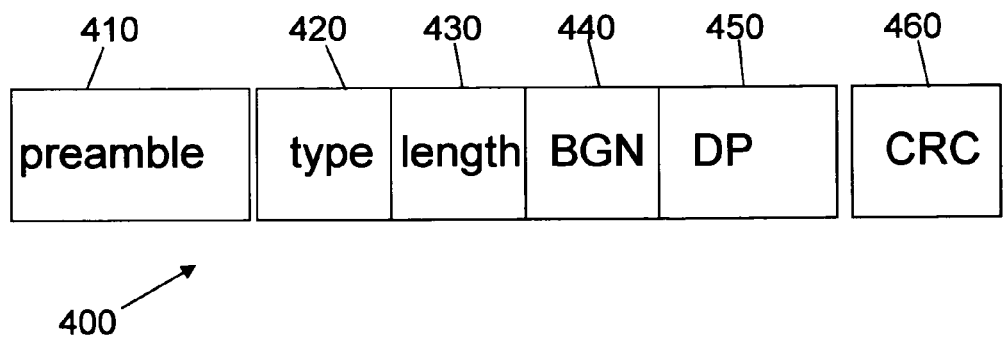
FIG. 4 depicts an exemplary beacon packet according to Applicants' invention.

FIG. 4 depicts an exemplary beacon message packet 400 transmitted by a network controller or master that enables terminal grouping as described above. The packet 400 advantageously starts with a preamble 410 that may be used by a terminal to train its radio (i.e., carry out frequency tuning, bit synchronization, etc.). After the preamble 410, there may be one or more fields for administrative information, such as a packet-type field 420 that indicates that this is a beacon packet and possibly a packet-length field 430 that indicates the length of the packet in bits, bytes, time, or other suitable measure.

The administrative fields may include information indicating the beacon Group for which this particular packet 400 is intended. If the beacon structure is fixed, this is not required, but including such information in either field 420 or field 430 or in a dedicated beacon group number (BGN) field 440 as shown gives the communication system more robustness, in that a terminal can synchronize itself to the master more often by listening to beacons intended for other Groups as described above. In addition, the BGN field gives the communication more flexibility, in that beacon transmissions scheduled for one Group can be replaced by beacon messages directed to a different Group. For example in FIG. 3, suppose there is little or no traffic (no pending packets) in Groups A and B but there is a lot of data pending for a slave in Group C. The master unit can temporarily transmit only Group-C beacons at an interval of T0. Since C-units wake up at every T0, transactions can be continued at a fast pace until the data-pending buffers are emptied. Units of Groups A and B wake up at their scheduled times and can synchronize to the beacons but will notice that the beacons belong to another group as indicated by the BGN.

The next field in the packet 400 is a data-pending (DP) field 450 that preferably includes a bitmap, in which each bit corresponds to a terminal in a Group. If a bit in the bitmap is set, the corresponding terminal is to remain awake after the beacon packet as the controller will start downloading the pending data to the terminal. For example, a communication system including eight terminals may use an 8-bit bitmap, and such a bitmap sequence 00110000 may indicate that data is pending for terminals 3 and 4. Of course, other forms of mapping may be used instead of the binary form shown.

It will be appreciated that the field DP 450 may have variable length, and such packets require length fields 430. For example, all bits that are not set and that are located in the bitmap after the last set bit can be omitted. Thus in the previous example, a reduced bitmap of 0011 can be included in the field 450. When no bits are set (i.e., there is no data pending), the field 450 need not be transmitted at all. Finally, the beacon message may be protected by Cyclic Redundancy Check (CRC) bits 460 to detect bit errors.

It is advantageous to keep the length of the beacon packet as short as possible, which can be done, on average, by minimizing the length of the DP field 450. This can be accomplished by allocating slaves, for which data are likely, to bit positions that arrive early in the bit map. (In FIG. 4, the left-most bit arrives earliest.) In this way, slaves that are unlikely to have data pending are allocated later positions in the bitmap, and those positions can be omitted when the beacon is transmitted. The probability of data pending can be "learned" by the system by tracking over time which slaves are being sent data frequently. Those slaves are allocated bit positions in the bit map that arrive as early as possible, and when conditions change (e.g., a slave gets data more frequently than in the past), the system can adapt by changing bitmap positions of the slaves.

Figure 5:
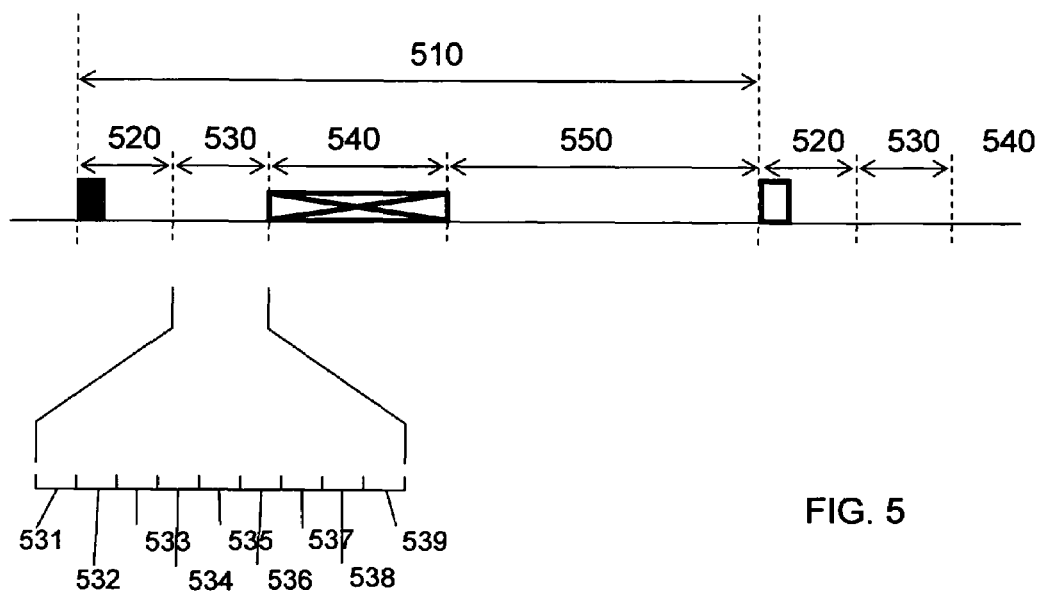
FIG. 5 is a timing diagram showing an exemplary beacon window according to Applicants' invention.

FIG. 5 shows a beacon window 510, which as described above is an interval starting at a beacon transmission and ending at the start of the next beacon transmission. The beacon window has four segments: (1) a beacon packet transmission interval 520, (2) an access request window 530, (3) an active data exchange window 540, and (4) a sleep window 550.

After a beacon message packet has been transmitted during an interval 520, the terminals are permitted to request access to a channel of the communication system. This can be achieved in several ways during the window 530. For example, the window 530 can be a contention window during which terminals just send their channel access requests. In a most simple scheme that is called ALOHA, each terminal sends without listening first, and so requests from different terminal may collide, rendering them unintelligible by the controller. To help isolate different requests, a contention resolution scheme can be used, and several such schemes are known to those skilled in the art. Instead of ALOHA, terminals may listen before they transmit to check whether the channel is free in a scheme called Carrier Sense Multiple Access (CSMA). If the channel is occupied, a terminal refrains from sending at that moment and tries again later, at a moment that is often randomly determined. But even with CSMA, collisions cannot be avoided completely because terminals may listen simultaneously and then start transmitting simultaneously. This often occurs when listening starts at a fixed point in time, such as immediately after the beacon transmission. In addition, terminals may not be able to hear each other's transmissions. In all of these schemes, the request message should include the identity of the terminal so that the controller knows the source of the request.

Another channel access scheme is illustrated by FIG. 5. The access window 530 is advantageously divided into a plurality of time slots 531, 532, . . . , 539. At initialization of the network, each terminal in a Group is allocated one of these time slots. When a terminal requires access, it just has to send a channel access indication in its allocated slot in the window 530. Although not strictly required, it is believed to be advantageous for the allocated time slot, the terminal, and the bit in the beacon message bitmap to correspond to one another. Then, the channel access indication does not have to include the identity of the terminal as the time slot position reveals the identity. The channel access indication message can be a common code word or signal that is easily detected by the controller (e.g., the access code for a master unit in a BLUETOOTH® network). If a Group includes more terminals than there are time slots in the window 530, a time slot can be allocated to more than one terminal. Collisions may then occur, but the probability of a collision should be small as long as the offered traffic, i.e., the average rate of channel access messages, times the number of terminals sharing the same time slot is small.

A terminal for which data is pending (indicated in the field 450 of packet 400) or which has issued a channel access request in the access window 530 remains awake for the remainder of the beacon window 510 or until the transaction has finalized. Other terminals can enter a sleep mode until the next beacon message for their Group is scheduled. During the active window 540, data may be exchanged by a terminal and the controller. The window 540 advantageously has a variable length that depends on the amount of data to be exchanged. In a BLUETOOTH® network, the master controller addresses the terminal, downloading information pending in the controller and/or uploading information waiting in the terminal. Such data pending indications may be signaled by a control bit in the packet header in uplink and downlink messages. When no data is pending anymore for that particular terminal, the terminal may enter the sleep mode. The sleep window of the terminal ends at the start of the next beacon transmission associated with its Group. When there is no data pending in or for any terminal, the controller can go to sleep as well. The sleep window of the controller ends at the next beacon transmission for any Group.

Figure 6:
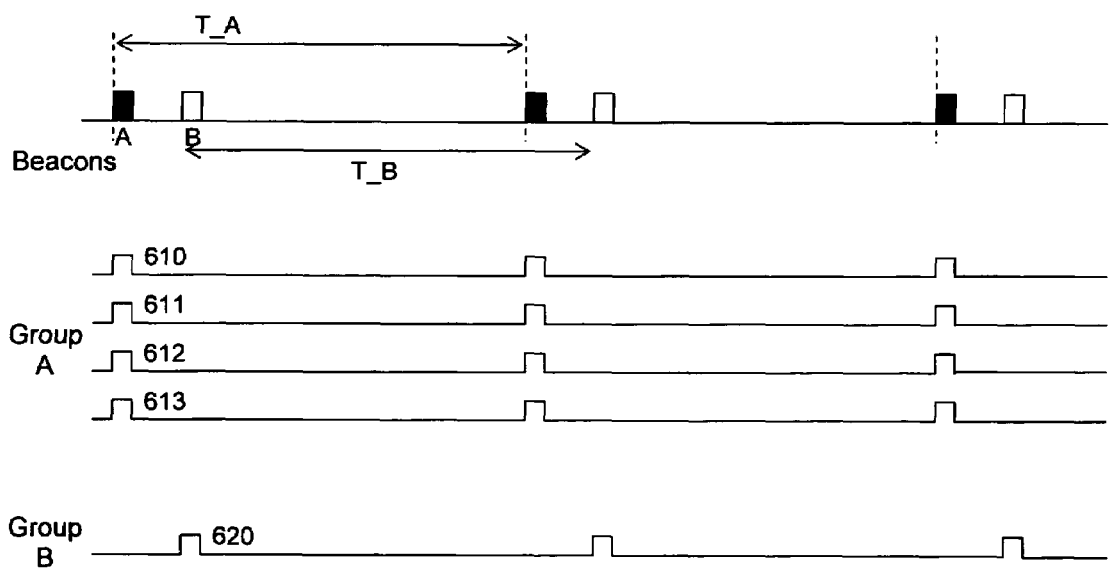
FIG. 6 is a timing diagram showing exemplary staggered beacons for scalability according to Applicants' invention.

With Applicants' beacon Groups, a communication system can easily be scaled up to support a larger number of terminals. Without Applicants' beacon Groups, the beacon packet and access window must be dimensioned for the largest number of terminals to be supported, irrespective of whether they are present or not. With Applicants' beacon Groups, a network can start with a single beacon Group, supporting say four terminals, and if the number of terminals grows, additional beacon Groups can be added. In this way, it is not necessary to design the network once for the worst-case number of terminals, but a network can adapt as the number grows. Additional beacon Groups are simply supported by beacon messages staggered with respect to former beacon messages. FIG. 6 is a timing diagram for an exemplary system that starts out with four terminals 610, 611, 612, 613, which may be collected in one beacon Group A. A beacon packet 400 thus would contain a bitmap 450 of four bits, and the access window 530 would comprise four slots. When an additional terminal 620 is added, it may be placed in a second beacon Group B, which is time-shifted with respect to beacon Group A. Without changing the structure of the beacon packet or the access window, terminals can be added to the beacon Group B until a total number of eight terminals has been reached, at which point a third beacon Group can be added, and so on.

Figure 7:
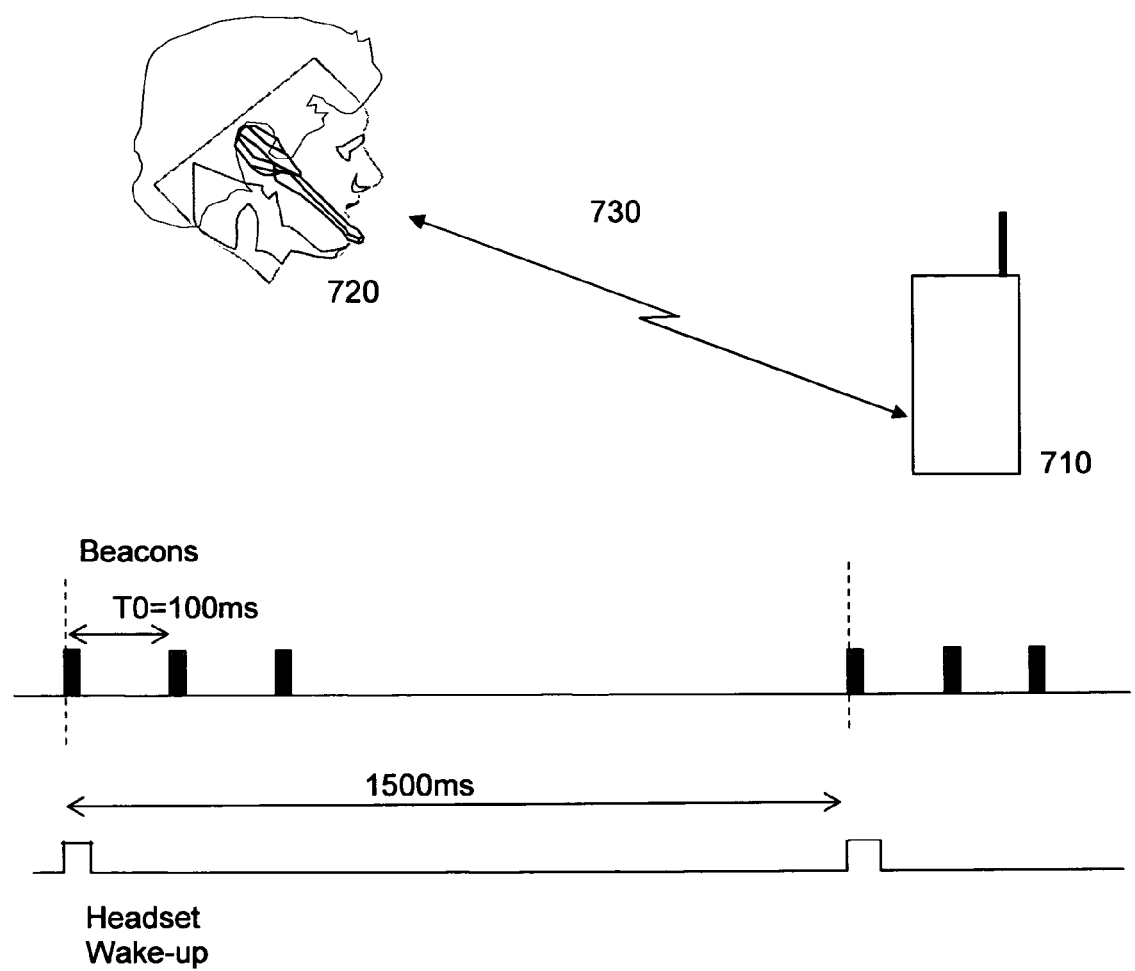
FIG. 7 illustrates a headset application using a channel access scheme according to Applicants' invention.

The following describes some applications of the channel access schemes described above. FIG. 7 depicts a communication system 700 including a mobile phone 710 and a headset 720 that are connected by a BLUETOOTH® link 730. As indicated by the timing diagrams in the figure, the headset 720 is in standby mode most of the time (i.e., the headset is waiting for an incoming or outgoing call). For outgoing calls, the latency requirements are stringent: after a button is pushed on the headset, the user expects something to happen within, say, 100 ms, so the uplink latency (the mobile phone 710 is the controller in this case) is on the order of 100 ms. For an incoming call, many operations happen in the network and the phone of which the headset user has no knowledge, and the delay between the arrival of a call and the signaling in the headset can be up to a few seconds. Therefore, the downlink latency is, say, 1.5 seconds. A useful beacon structure for this headset application is shown in FIG. 7 and includes beacon transmissions 750 scheduled every T0=100 ms, but the headset 720 need not wake up every 100 ms. In order to save power, the headset wakes up every 1.5 s, or every fifteenth beacon transmission. The phone 710 can activate the headset every 1.5 s, so the latency in the downlink is 1.5 s. Yet, when a button is pushed on the headset 720, the headset can activate the phone at any of the beacon times scheduled 100 ms apart.

It will be recognized that like the headset 720, other low-traffic devices are a keyboard, a mouse, and a game controller, any or all of which can be wirelessly connected to a PC or other device that takes the place of the phone 710.

Figure 8:
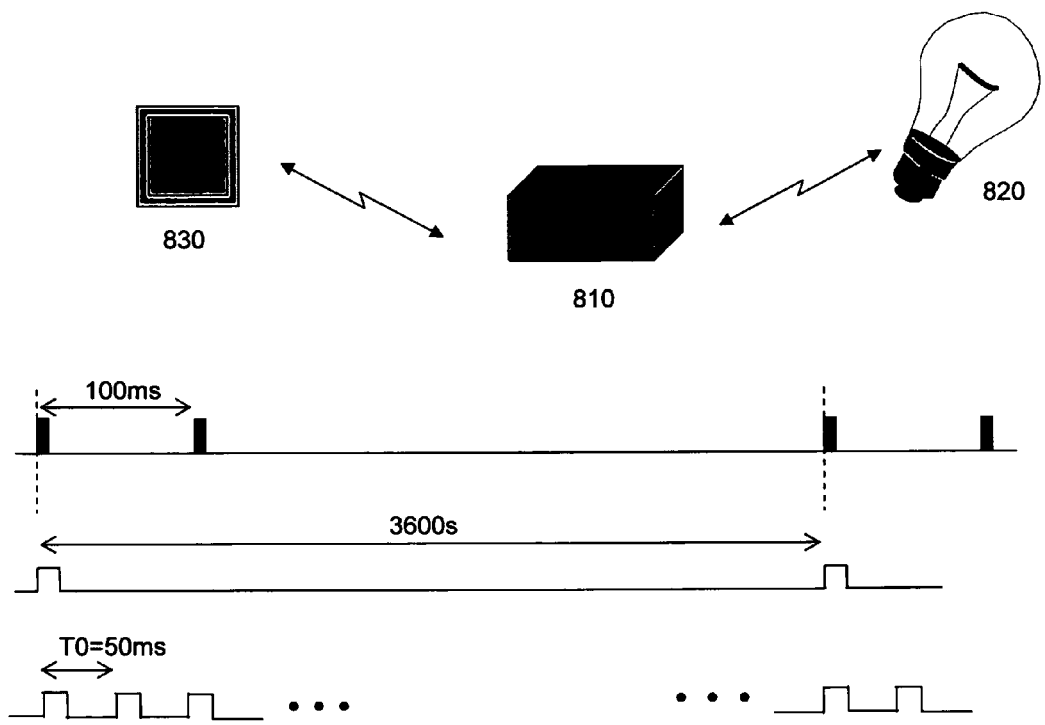
FIG. 8 illustrates a light switch application using a channel access scheme according to Applicants' invention.

Another application of Applicants' channel access scheme is a light switching system 800 depicted in FIG. 8. The system 800 includes a controller 810, a light bulb 820, and a light switch 830. Let only the switch 830 be battery-powered. For the switch, the downlink latency is infinite, i.e., no traffic is expected from the controller 810 to the switch 830, but the uplink latency should be short, as a push on the switch should quickly result in a change of the bulb status, say, within 100 ms. As a result, the beacon interval provided by the controller 810 should be on the order of 100 ms. The switch 830 can sleep for an extended period, but it can have problems with synchronization: how long can it sleep before it loses sync to the beacon. This can be seconds to minutes (or even hours or days), depending on the clock timing accuracies of the system. Of course, when the switch is pushed, the system wakes up immediately and catches the beacon within 100 ms in order to send a channel access request (or a direct message, e.g., turn bulb on/off). For the light bulb 820, the opposite latency requirements hold: the uplink latency is infinite and the downlink latency should be on the order of 100 ms. In fact, since there are no power restrictions on the bulb in this example, the bulb could listen more frequently than the beacon transmissions, and in FIG. 8, the bulb listens for a beacon every 50 ms. When the controller receives an order from the switch to change the bulb status, it may schedule an additional beacon transmission at the 50 ms grid, and thus the latency from the switch 830 to light bulb 820 is reduced to 150 ms. In principle, the light bulb 820 could listen continuously and be outside the beacon access scheme if it has no power limitations.

Figure 9:
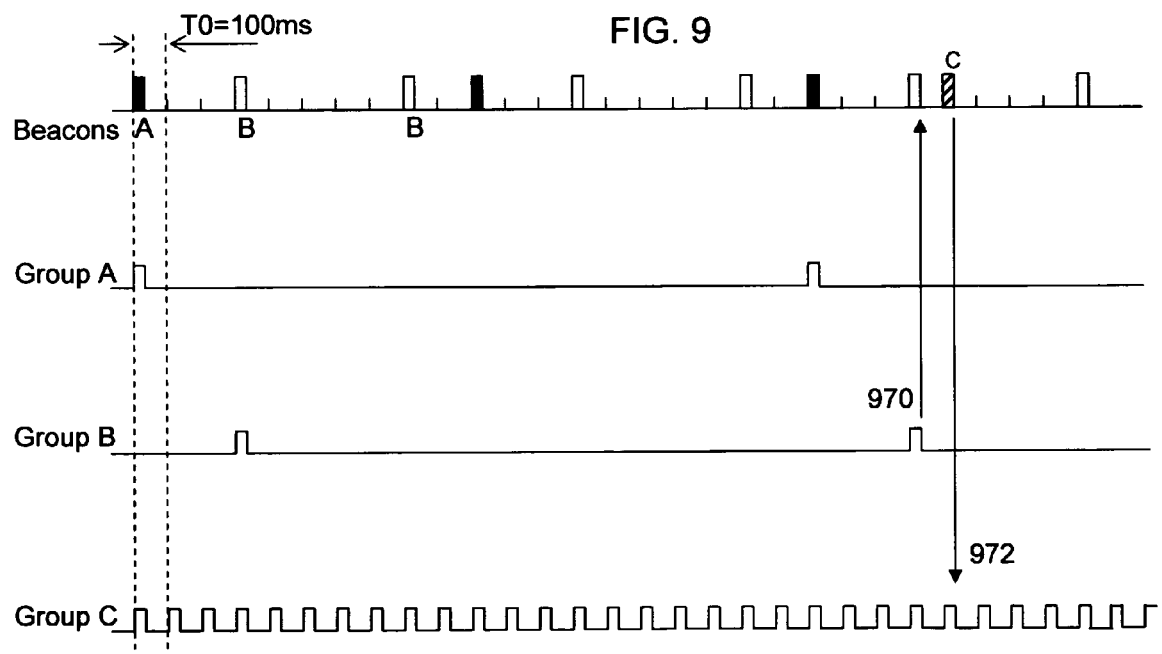
FIG. 9 is a timing diagram for an industrial automation example using a channel access scheme according to Applicants' invention.

Yet another application of Applicants' channel access scheme is a factory floor system depicted in FIG. 9 as having three types of terminals. A first type, call it A, includes sensors measuring temperature and humidity. A second type, call it B, includes sensors measuring pressure, and a third type C includes valves that regulate the pressure measured. For types A and B terminals, it is likely that only the uplink latency need be considered, and let the sensor time constants of type A be on the order of two seconds and of type B be on the order of 0.5 seconds. For type C terminals, it is likely that only the downlink latency need be considered, and let the valve time constants be on the order of 0.1 seconds.

A communication system having three beacon groups can now be configured. The beacon grid timing T0 is based on the shortest latency, which in this example is 0.1 s. The beacons for beacon Group A can be spaced at 1 s intervals, which is still less than their time constants, and the beacons for beacon Group B are spaced at intervals of 0.5 s and staggered in time by 0.3 s with respect to the Group A beacons. Since the downlink latencies for Groups A and B are not important in this example, the wake up interval for these groups can be based on synchronization requirements only; in FIG. 9, an interval of 2 s is assumed to be sufficient.

Beacon Group C does not really need separate beacon transmissions, as only downlink transmission is to be expected. The terminals in Group C wake up at every beacon grid point, i.e., at intervals of 0.1 s, and for synchronization purposes, they can use the beacons of Groups A and B. If the controller needs to activate a valve in beacon Group C, it provides a beacon message at a point (presumably, the nearest) on the beacon grid, irrespective of the state of this grid point (e.g., it might have been scheduled for Group A or Group B transmission). The Group A or B beacon transmission is either cancelled or scheduled at the next available beacon point. In FIG. 9, a sensor in beacon Group B indicates the pressure is too high at point 970. At point 972, a Group C beacon is transmitted to order a valve to lower the pressure. Such an occasion is the only time when a Group C beacon is transmitted in this example.

It should be understood that the 0.3 s beacon staggering of Groups A and B is arbitrary, although the amount of staggering influences the performance of the communication system. For example, suppose a Group-A beacon is at T0 and a Group-B beacon is at 3T0. The beacon window 510 for beacon A is then only 3T0, which in this example may be an upper limit on the amount of transactions (packet lengths) that can be carried out for the Group-A units. To avoid such an upper limit, the communication system may allow the next beacon to be over-ridden, e.g., if transactions are still going on. Thus, if the transactions for beacon Group A are not finished by the time the Group-B (next) beacon is due to be transmitted, the transactions just continue and the Group-B beacon is canceled for that moment. Group-B units wake up, do not find a beacon, and return to sleep. At the next or later wake-up moment, the Group-B units find their B-beacon again.

It will be understood that Applicants' access methods and apparatus differ from many previous systems that do differentiate between or among slaves in the same category. Thus, Applicants avoid major disadvantages of such systems. For example, if data pending is indicated in a beacon, all slaves in the category that are awake try to gain access to the channel, despite the possibility that the pending data may relate to only a single slave. Moreover, if a remote terminal has a low duty cycle (as different terminals in the same category may have different sleep intervals), at many occasions the terminals in the same category try to access the channel just to find out frequently that no data is pending for them. This is not very power-efficient. In some embodiments of Applicants' invention, the beacon addresses a Group and a data pending field, which may include a bitmap, points to particular terminals in the Group.

Applicants' remote terminals are grouped in respective beacon Groups according to their latency requirements, and terminals in different Groups listen to different beacon messages. In this way, different latency characteristics can be served easily.

As described for example in U.S. Pat. No. 6,574,266 to Haartsen, a BLUETOOTH® system employs the 2.4 GHz ISM band that is divided into seventy-nine channels, starting at 2402 MHz and spaced apart by 1 MHz. Terminals communicate by hopping their carrier signals from one channel to another channel, e.g., from 2405 MHz to 2480 MHz to 2463 MHz, etc., according to a pseudo-random pattern. As long as the units hop in synchrony and with the same phase, they simultaneously use the same channel and thus stay in contact with each other. Although a BLUETOOTH® system uses radio channels, it will be appreciated that the principles of Applicants' invention can be used in systems that use other types of communication channel, such as free-space or fiber optical channels, etc.

Figure 10:
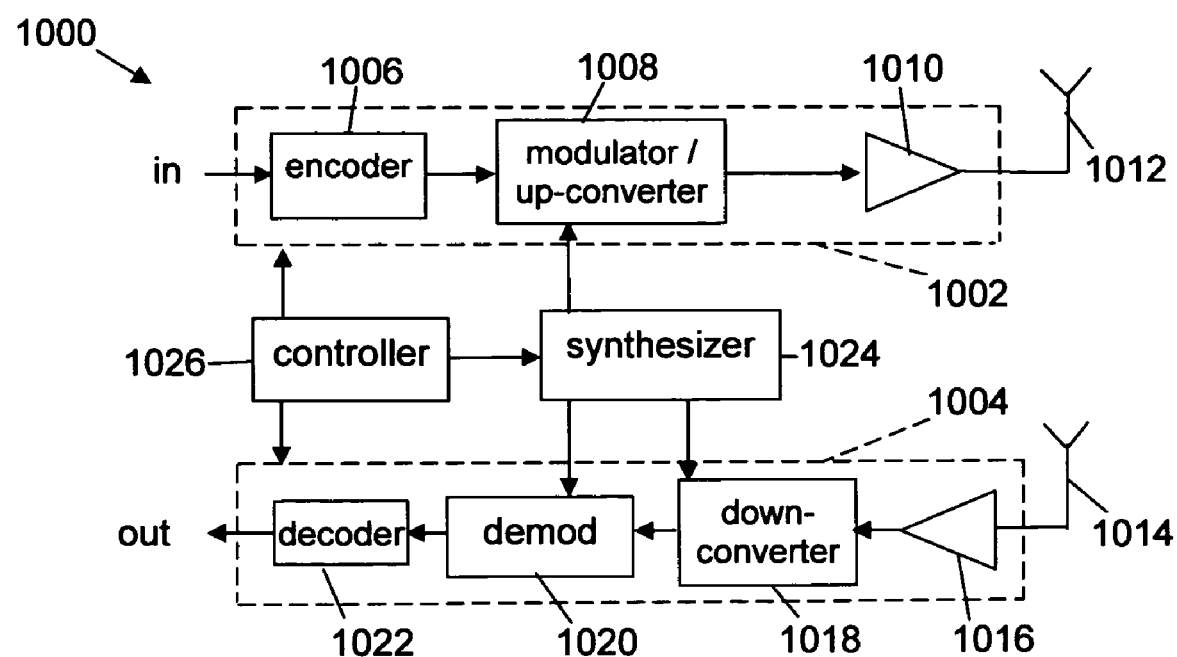
FIG. 10 is a block diagram of a terminal in a communication system.

FIG. 10 is a block diagram of a terminal 1000 that can operate according to the BLUETOOTH® system and that has a transmitter (TX) section 1002 and a receiver (RX) section 1004. Messages to be transmitted are passed by an input of the TX section 1002 to an encoder 1006, which preferably processes the input information according to an error-correcting code and, perhaps, a security code. Forward error correction and scrambling codes are well known in the art of cellular radio telephony, so they need not be described in more detail here. The encoded information produced by the encoder 1006 is provided to a modulator/up-converter 1008, which modulates a higher-frequency carrier signal with the encoded information according to the format and access technique employed by the system. The magnitude of the modulated carrier produced by the modulator/up-converter 1008 is then typically increased by a power amplifier 1010, which provides its output signal to a communication channel, such as the air via a suitable TX antenna 1012.

In the RX section 1004, a portion of a modulated carrier signal received from the communication channel, such as the air by a suitable RX antenna 1014 is provided to an amplifier 1016, which increases the magnitude of the received portion without adding substantial noise and provides the increased modulated carrier signal to a down-converter 1018. The carrier signal is stripped away by the down-converter 1018, and the resulting signal is provided to a demodulator 1020 that in essence produces a replica of the encoded information that modulated the carrier signal. That encoded information is decoded by a decoder 1022, and the received information is passed by an output of the RX section 1004 to a user or further processing devices.

The modulator/up-converter 1008, down-converter 1018, and demodulator 1020 carry out their functions using local oscillator and other signals having precisely controlled frequencies, which may be generated by a suitable synthesizer 1024. The frequencies selected for the synthesizer and other aspects of the terminal 1000, such as those described above, are determined by control signals provided by a controller 1026, which may be a suitably programmed signal processor or logic circuit. For example, the controller may be configured to cause the transmitter portion to broadcast beacon messages on the communication channel as described above.

It will be appreciated that procedures described above are carried out repetitively as necessary. To facilitate understanding, many aspects of Applicants' invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, Applicants' invention can additionally be considered to be embodied within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A communication system, comprising:
a central control station that broadcasts beacon messages on a communication channel; and
at least one remote terminal that accesses a communication channel based on the beacon messages;
wherein the beacon messages provide timing references for the at least one remote terminal, signal a remote terminal that data is waiting in the control station, enable a remote terminal to request access to the communication channel, and are configured such that access to the communication channel by a terminal is controlled according to a grouping of the terminal into a respective beacon group; remote terminals of a beacon group are permitted to send channel access request messages during an access window following a beacon message corresponding to the beacon group; the access window includes a plurality of consecutive time slots, and remote terminals are allocated to respective time slots and send channel access request messages during their allocated time slots; and an allocated time slot, a remote terminal, and a data-pending indication in a beacon message correspond to one another.

2. The system of claim 1, wherein each beacon group has a corresponding beacon message, and beacon messages corresponding to different beacon groups are broadcast at staggered time intervals.

3. The system of claim 2, wherein time intervals between beacon messages corresponding to different beacon groups are different.

4. The system of claim 2, wherein the central control station replaces at least one beacon message corresponding to a first beacon group with at least one beacon message corresponding to a second beacon group.

5. The system of claim 1, wherein time intervals between beacon messages corresponding to a beacon group are selected according to latency requirements for communication from remote terminals in the group to the central control station.

6. The system of claim 5, wherein remote terminals having the same latency requirements are grouped in the same beacon group.

7. The system of claim 6, wherein a remote terminal in a beacon group listens to selected ones of beacon messages corresponding to the beacon group, and the beacon messages are selected according to on the latency requirements for communication from the central control station to the remote terminal.

8. The system of claim 5, wherein a remote terminal in a beacon group listens to at least one beacon message corresponding to another beacon group.

9. The system of claim 1, wherein beacon messages corresponding to a beacon group indicate data is pending transmission for respective remote terminals in the beacon group.

10. The system of claim 9, wherein beacon messages corresponding to a beacon group include bitmaps that indicate data is pending transmission for respective remote terminals in the beacon group.

11. The system of claim 10, wherein a bitmap has a length that depends on a number of remote terminals for which data is pending transmission and a data-pending indication in a beacon message correspond to one another.

12. The system of claim 1, wherein the central control station is a telephone and the remote terminal is a headset.

13. The system of claim 1, wherein the remote terminals include a light switch and a light bulb.

14. The system of claim 1, wherein the remote terminals include a plurality of sensors for measuring at least one of temperature, humidity, and pressure.

15. The system of claim 1, wherein the system is a BLUETOOTH® system.

16. A terminal for a communication system, comprising:
a transmitter that sends messages through a communication channel;
a receiver that receives messages from the communication channel; and
a controller that operates the transmitter and receiver in response to beacon messages on the communication channel;
wherein the terminal uses beacon messages as a timing reference, as signals that messages are waiting to be received, and to enable the terminal to request access to the communication channel, and the terminal accesses the communication channel according to a grouping of the terminal into a respective beacon group; the controller operates the transmitter to send a channel access request message during an access window following a beacon message corresponding to the beacon group; the access window includes a plurality of consecutive time slots; the terminal is allocated to a respective time slot and sends its channel access request message during its allocated time slot; and an allocated time slot, the terminal and a data-pending indication in a beacon message correspond to one another.

17. The terminal of claim 16, wherein the beacon group has a corresponding beacon message, and beacon messages corresponding to the beacon group are broadcast at staggered time intervals.

18. The terminal of claim 17, wherein time intervals between beacon messages corresponding to the beacon group are based on latency requirements of the terminal.

19. The terminal of claim 18, wherein the terminal listens to selected ones of beacon messages corresponding to the beacon group, and the beacon messages are selected according to the latency requirements for communication to the terminal.

20. The terminal of claim 16, wherein the terminal listens to at least one beacon message that does not correspond to the beacon group.

21. The terminal of claim 16, wherein the terminal is a headset.

22. The terminal of claim 16, wherein the terminal is one of a light switch and a light bulb.

23. The terminal of claim 16, wherein the terminal is a sensor for measuring one of temperature, humidity, and pressure.

24. The terminal of claim 16, wherein the terminal is one of a keyboard, a mouse, and a game controller.

25. The terminal of claim 16, wherein the terminal is included in a BLUETOOTH® system.

26. A central control station for a communication system, comprising:
 a transmitter configured to send messages through a communication channel;
 a receiver configured to receive messages from the communication channel; and
 a controller configured to cause the transmitter to broadcast beacon messages on the communication channel;
 wherein the beacon messages provide a timing reference, signal that data is waiting in the control station, enable requests for access to the communication channel, and are configured such that access to the communication channel is controlled according to beacon groups, requests for access corresponding to a beacon group are enabled during an access window following a beacon message corresponding to the beacon group; the access window includes a plurality of consecutive time slots; requests for access corresponding to the beacon group are allocated to respective time slots; and a data-waiting indication in a beacon message, an allocated time slot, and an intended recipient of the data correspond to one another.

27. The station of claim 26, wherein each beacon group has a corresponding beacon message, and beacon messages corresponding to different beacon groups are broadcast at staggered time intervals.

28. The station of claim 27, wherein time intervals between beacon messages corresponding to different beacon groups are different.

29. The station of claim 27, wherein at least one beacon message corresponding to a first beacon group is replaced with at least one beacon message corresponding to a second beacon group.

30. The station of claim 26, wherein time intervals between beacon messages corresponding to a beacon group are selected according to latency requirements for communication to the station.

31. The station of claim 26, wherein beacon messages corresponding to a beacon group include bitmaps that selectively indicate data is pending transmission.

32. The station of claim 26, wherein the station is a telephone.

33. The station of claim 26, wherein the station is a terminal in a BLUETOOTH® system.

* * * * *

UNITED STATES PATENT AND TRADEMARK OFFICE
CERTIFICATE OF CORRECTION

PATENT NO.       : 7,231,221 B2
APPLICATION NO.  : 10/926854
DATED            : June 12, 2007
INVENTOR(S)      : Assarsson et al.

It is certified that error appears in the above-identified patent and that said Letters Patent is hereby corrected as shown below:

On the Title Page, in item (73), under "Assignee", in Column 1, Line 1, delete "L M" and insert -- LM --, therefor.

In Column 14, Lines 35-36, in Claim 11, after "transmission" delete "and a data-pending indication in a beacon message correspond to one another."

Signed and Sealed this

Sixth Day of July, 2010

David J. Kappos
*Director of the United States Patent and Trademark Office*